United States Patent
Sutyak

[15] 3,657,953
[45] Apr. 25, 1972

[54] EDGING AND SLITTING APPARATUS AND METHOD

[72] Inventor: John J. Sutyak, Pittsburgh, Pa.

[73] Assignee: Mesta Machine Company, Pittsburgh, Pa.

[22] Filed: July 24, 1968

[21] Appl. No.: 747,219

[52] U.S. Cl..........................................83/8, 83/9, 83/112,
83/123, 83/487, 83/508
[51] Int. Cl......................................................B23d 19/02
[58] Field of Search....................83/13, 14, 19, 52, 483, 485,
83/487, 614, 617, 622, 636, 640, 642, 112, 9, 214,
701, 8, 123, 508

[56] References Cited

UNITED STATES PATENTS

| | | | |
|---|---|---|---|
| 1,807,840 | 6/1931 | Gollnick et al.........................83/483 X |
| 3,476,000 | 11/1969 | Wheeler................................83/487 X |

FOREIGN PATENTS OR APPLICATIONS

| | | | |
|---|---|---|---|
| 437,291 | 11/1926 | Germany...................................83/487 |
| 707,428 | 4/1953 | Great Britain............................83/487 |
| 619,648 | 5/1961 | Canada.....................................83/487 |
| 268,540 | 4/1927 | Great Britain............................83/112 |
| 1,144,082 | 2/1963 | Germany...................................83/614 |

Primary Examiner—Andrew R. Juhasz
Assistant Examiner—James F. Coan
Attorney—Donn J. Smith

[57] ABSTRACT

Cutting apparatus comprising elongated cutting means, means for mounting said cutting means for substantially contingent engagement by material to be cut by said apparatus, first and second cutting means, means for tandemly mounting said first and said second cutting means in juxtaposition to said elongated cutting means for cutting engagement with said material when disposed therebetween, means for urging said first cutting means into scoring engagement with said material, means for urging said second cutting means into shearing or parting engagement with said material along the scoring produced by said first cutting means, and means for moving said first and said second cutting means relative to elongated cutting means. Similar cutting apparatus is disclosed wherein each of said first and said second cutting means are provided with a pair of knife edges, and said elongated cutting means include a pair of elongated generally parallel knife edges, said knife edges of each of said first and said second cutting means being juxtaposed respectively to said parallel knife edges for material slitting operations. A method of cutting thick plate material is also disclosed, said method comprising the steps of supporting said material on a knife edge co-extending with an intended cut and aligned therewith, scoring said plate along said cut, and parting said plate along said scoring.

17 Claims, 14 Drawing Figures

INVENTOR
John J. Sutyak.

INVENTOR
John J. Sutyak
BY
HIS ATTORNEYS

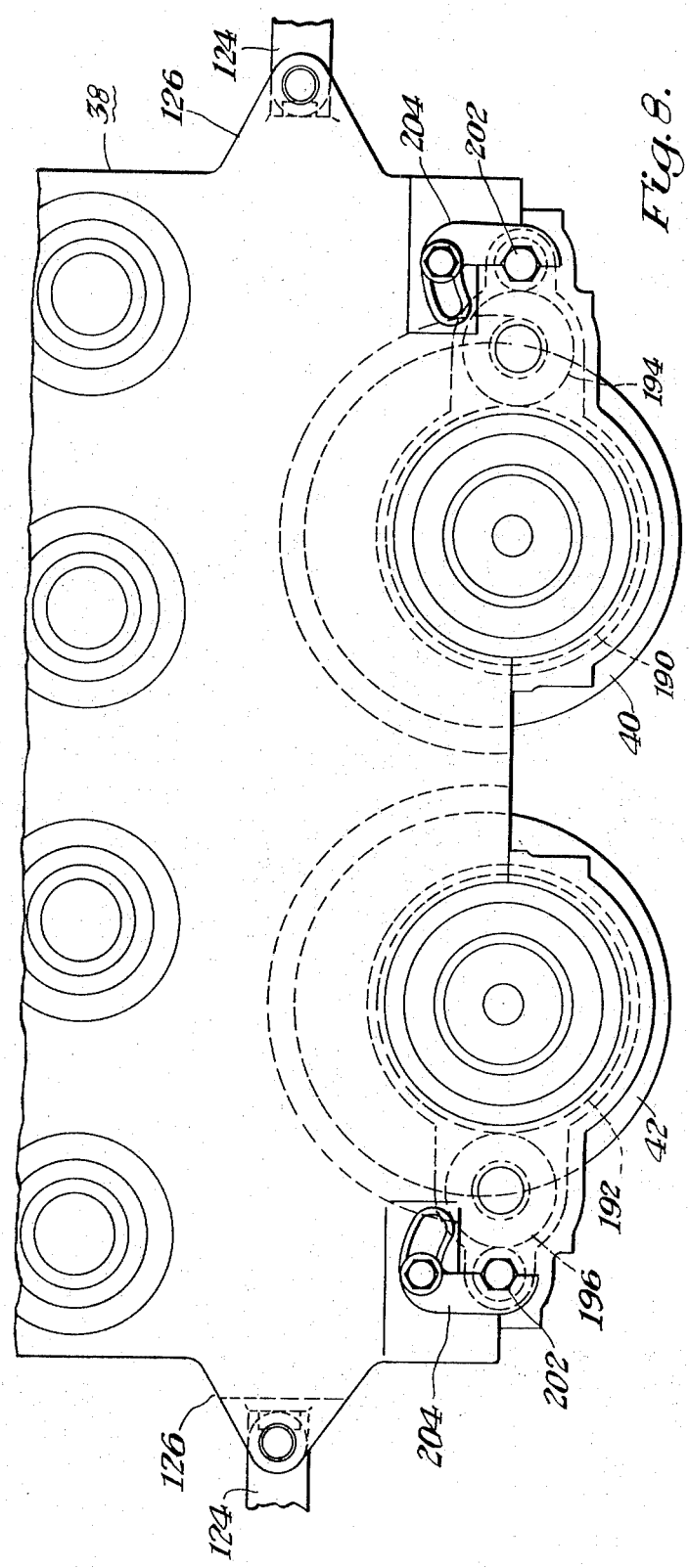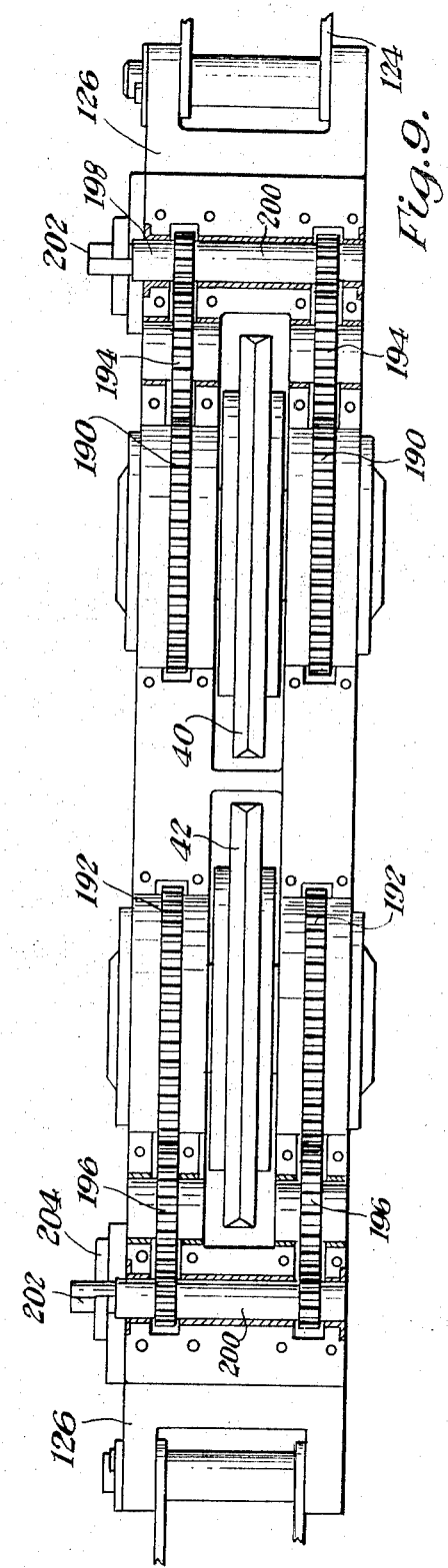

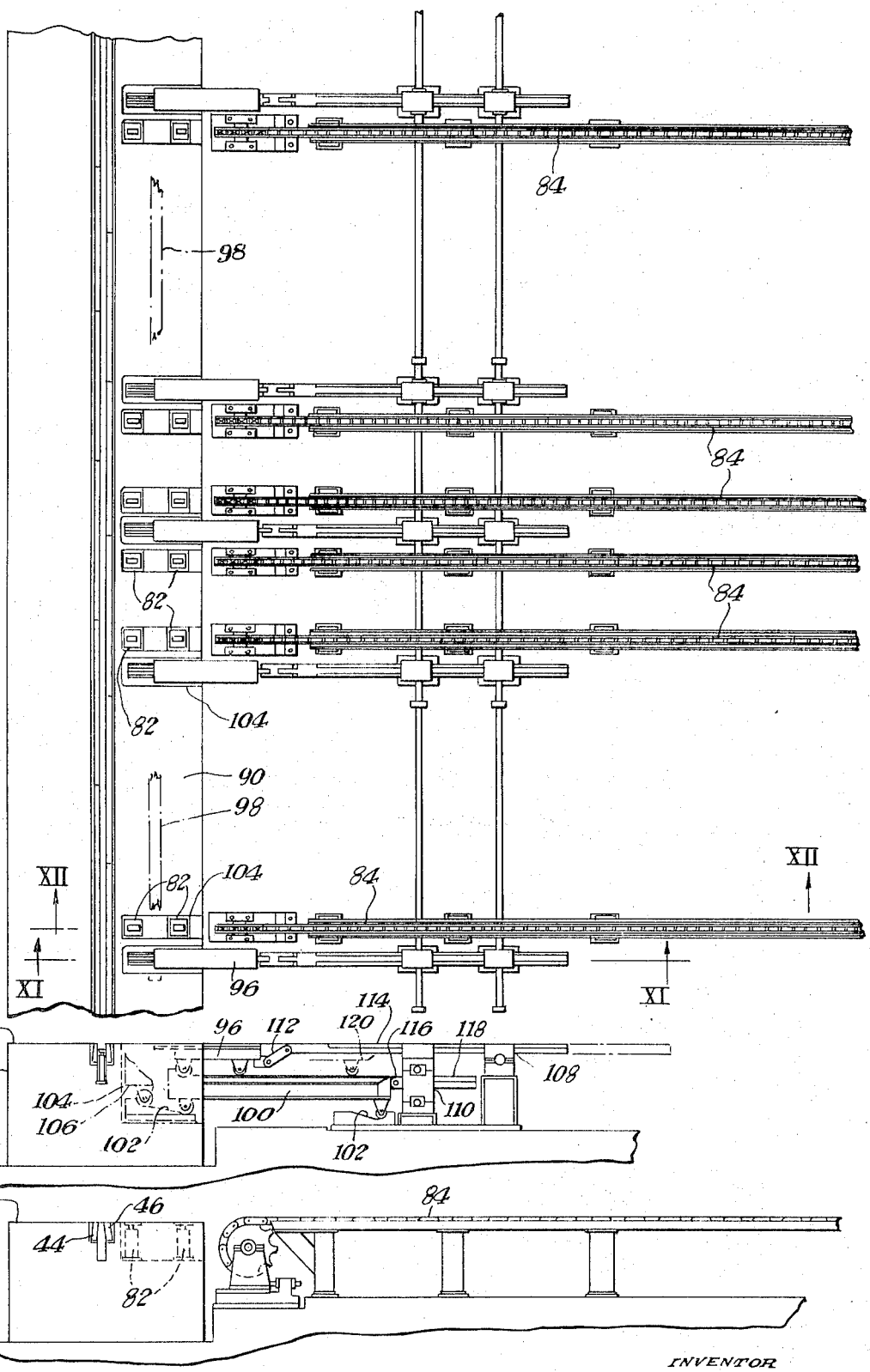

EDGING AND SLITTING APPARATUS AND METHOD

The present invention relates to novel cutting apparatus and more particularly to apparatus of the character described capable of trimming the edges of and slitting relatively thick materials, such as steel plate. My invention contemplates in addition, novel means for preventing curling of scrap, for feeding the plate or other material into the cutting apparatus, and for obviate edge or other distortions in the cut materials.

Although the disclosed cutting apparatus and method are described with particular reference to cutting steel plate, it will be obvious that the invention is capable of use with other difficult-to-cut materials.

In recent years the demand for accurately trimmed plate of substantial thickness has increased to a considerable extent. Heretofore it has been necessary to rough-cut plate material followed by retrimming the edges thereof with squaring shears. Squaring shears conventionally consist of a rotary cutting blade disposed for shearing action against a single flat shearing edge. The edge trimming produced by the squaring shear curls uncontrollably and complicates scrap handling. Obviously, conventional squaring shears cannot be used for splitting or severing relatively thick plate into smaller pieces. Therefore, relatively thick plates must be severed by burning or by means of a guillotine shear, afterwhich those edges of the plate sections adjacent the rough cut have to be trimmed, when close tolerances are required. In this case, three cutting operations are required in place of the single plate severing or slitting operation provided by my invention. Moreover, the accuracy of subsequent edge trimming operations with known cutting apparatus has left much to be desired. Curling and other distortion of the adjacent plate edges usually could not be avoided.

In addition to the aforementioned known cutting means, there are many known forms of rotary shears for cutting and/or slitting relatively thin, strip or sheet materials. Examples of such apparatus are shown in the U.S. patents to Knepshield U.S. Pat. No. 3,080,783; Clayton U.S. Pat. No. 2,309,045; Nash U.S. Pat. No. 2,203,738; Grevich U.S. Pat. No. 3,191,474 and Jones U.S. Pat. No. 3,257,887 which disclose rotary side trimmers, and the U.S. patents to Bottenhorn U.S. Pat. No. 2,679,900; Thomas U.S. Pat. No. 1,619,684; Cohen U.S. Pat. No. 2,307,452 and Hall U.S. Pat. No. 2,706,524 disclosing rotary shears for combined slitting and side trimming operations. None of these patents, however, discloses cutting apparatus which is capable of accurately trimming and/or slitting relatively thick steel plate. These cutting machines moreover impart a curl or other distortion to the trimmed or slit edges of the sheet material. Most importantly, none of these machines is capable of slitting relatively thick material such as steel plate.

I overcome these disadvantages of the prior art by providing cutting apparatus and methods whereby a pair of tandemly mounted knives are urged against plate material or the like in opposition to a stationary elongated cutting edge. The first of the knives scores the plate material to a depth sufficient to penetrate a work-hardened surface or skin layer thereof while the second movable knife shears or parts the material. This arrangement enables my cutting apparatus to handle thicker plate materials with greater rapidity and accuracy and with considerably reduced power requirements. Further, the tandem arrangement of moving knives coacts to minimize curling of scrap or trimmings removed from the plate material. Subsequent handling of the scrap is therefore greatly facilitated. Most importantly my novel cutting means and method do not distort the finished plate edges.

For plate slitting operations, each of my movable knives is provided with dual cutting edges for coaction respectively with a pair of elongated substantially parallel stationary cutting edges. This arrangement permits a relatively narrow strip of waste material to be removed from the plate during the slitting operation. The necessary but limited amount of cutting distortion, therefore, is imparted to the waste strip rather than to the edges of the severed plate sections. Curling of the severed strip however is minimized by the cooperative effects of the tandem, double-edged knives. During the severing operation the plate material is scored and subsequently parted along closely paralleled cutting lines.

To ensure accuracy in cutting depth, as my cutting apparatus progresses along an elongated cut, I also desirably provide a pre-deformable reference member or contour bar along which the movable knives are dragged in making such cut. The movable carriage for the knives is backed up by the contour bar such that reactive cutting forces applied to the contour bar by the carriage return the adjacent portion of the contour bar to a parallel position relative to the plate material, irrespective of a given position of the knife carriage along the length of the contour bar.

My invention contemplates also a novel feed mechanism useful with my novel cutting apparatus for feeding plate material either lengthwise or widthwise into the cutting apparatus for slitting and/or edge-trimming operations.

I accomplish these desirable results by providing cutting apparatus comprising elongated cutting means, means for mounting said cutting means for substantially contingent engagement by material to be cut by said apparatus, first and second cutting means, means for tandemly mounting said first and said second cutting means in juxtaposition to said elongated cutting means for cutting engagement with said material when disposed therebetween, means for urging said first cutting means into scoring engagement with said material, means for urging said second cutting means into shearing or parting engagement with said material along the scoring produced by said first cutting means, and means for moving said first and said second cutting means relative to said elongated cutting means each of said first and said second cutting means being provided with a pair of spaced knife edges, said elongated cutting means including a pair of elongated similarly spaced generally parallel knife edges, said knife edges of each of said first and said second cutting means being juxtaposed respectively to said parallel knife edges for material slitting operations, said first cutting means being capable of producing scoring cuts approximately to the depth of a work-hardened or skin layer of said material so that cutting distortions of said first and said second cutting means are imparted substantially exclusively to slitting waste cut from said material, said distortions coacting upon said slitting waste to substantially prevent said waste from curling and jamming between said elongated knife edges.

I also desirably provide similar cutting apparatus wherein means are provided for independently adjusting the distance of each of said first and said second cutting means from said elongated cutting means.

I also desirably provide similar cutting apparatus wherein each of said first and said second cutting means are provided with a pair of knife edges, and said elongated cutting means include a pair of elongated generally parallel knife edges, said knife edges of each of said first and said second cutting means being juxtaposed respectively to said parallel knife edges for material slitting operations.

I also desirably provide similar cutting apparatus wherein said first and said second cutting means are mounted respectively in eccentricly and rotatably mounted housings therefor for adjusting the juxtaposed distances between said first and said second cutting means and said elongated cutting means.

I also desirably provide similar cutting apparatus wherein said mounting means include a knife carriage mounted for movement along supporting means extending generally parallel to said elongated cutting means.

I also desirably provide similar cutting apparatus wherein said carriage supporting means is a contour bar extending generally parallel to said elongated cutting means, and means are provided for imparting a pre-selected pre-bowing of said contour beam in a direction toward said elongated cutting means.

During the foregoing description, various objects, features and advantages of the invention have been set forth. These and other objects, features and advantages of the invention together with structural details thereof will be elaborated upon during the forthcoming description of certain presently preferred embodiments of the invention and presently preferred methods of practicing the same.

In the accompanying drawings I have shown certain presently preferred embodiments of the invention and have illustrated certain presently preferred methods of practicing the same, wherein:

FIG. 8 is an enlarged front elevational view of the cutter carriage as shown in FIGS. 2 and 6;

FIG. 9 is a bottom plan view of the carriage as shown in FIG. 8;

FIG. 10 is an enlarged partial top plan view of the feeding mechanism and work table shown in FIG. 1;

FIG. 11 is a partial cross sectional view of the mechanism as shown in FIG. 10 and taken along reference line XI—XI thereof; and FIG. 12 is a cross sectional view of the mechanism as shown in FIG. 10 and taken along reference line XII—XII thereof.

Figure 1:
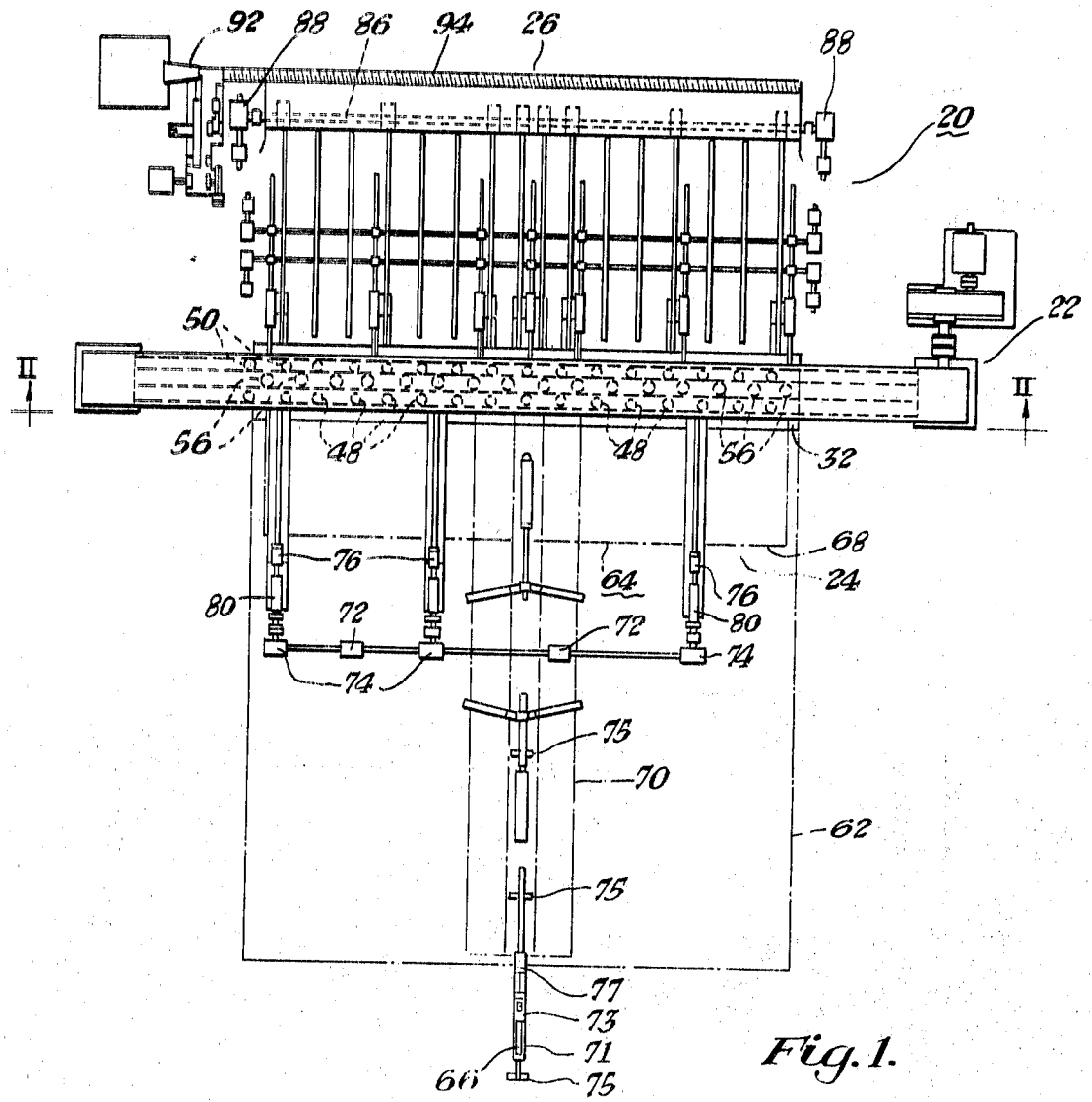
FIG. 1 is a top plan view of cutting and feeding apparatus and scrap disposal mechanism arranged in accordance with my invention.

Referring now more particularly to Figures 1—5 of the drawings, my novel cutting apparatus 20 includes in this example progressive cutting mechanism 22, plate feeding mechanism 24 and scrap disposal mechanism 26. It will be understood, of course, that other forms of feeding and scrap disposal mechanisms can be employed with the cutting mechanism 22, or the feeding and/or scrap disposal mechanism can be omitted altogether depending upon the specific application of the invention. As better shown in FIG. 2, the cutting mechanism 22 includes a main support or bridging beam 28 supported at its ends upon uprights 30, which in turn are spaced from the ends of an elongated work table 32. The table 32 as better shown in Figure 1 is disposed generally between the entry portion of the feeding mechanism 24 and the scrap disposal mechanism 26.

A contour bar or beam 34 is disposed in generally parallel, spaced relation between the bridging beam 28 and the table 32. To facilitate bending or contouring (Figure 4) of the intermediate beam or contour bar 34, the ends thereof are pivotally connected to and supported on the uprights 30, as denoted by reference characters 36.

As described in greater detail below a knife carriage 38 is mounted for movement along the contour beam 34 for juxtaposition of its first and second cutting means, including cutters 40, 42 with elongated cutting means including one or more cutting blades 44, 46 (Figures 2, 6, 8 and 9) mounted in the table 32 and co-extending in this example with the length thereof.

Means are provided for anti-frictionally mounting the knife carriage 38 for movement along the contour beam 34 and for dragging the knife carriage along the length of the table 32. Such means are described in greater detail hereinafter. As better shown in Figures 1, 3 and 5, two rows of plate hold down cylinders 48, 50 are secured to the undersurface of the contour beam 34 in an array co-extending substantially with the length of the worktable 32. One row of the cylinders, for example the row 50, is actuated for holding down a plate section 52 (Figure 7A) for edge trimming while both rows of cylinders 48, 50 are actuated for holding down plate sections 54a, 54b (Figure 7) for plate slitting purposes. Each row of hold down cylinders is therefore actuated simultaneously but independently of the other row of cylinders, by suitable and known fluid circuitry (not shown).

Figure 4:
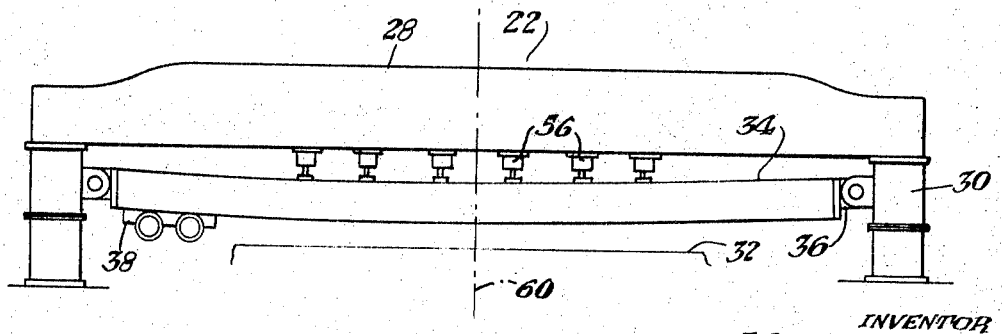
FIG. 4 is a schematic view similar to FIG. 2 and illustrating the operation of the aforementioned contour bar.
Figure 2:
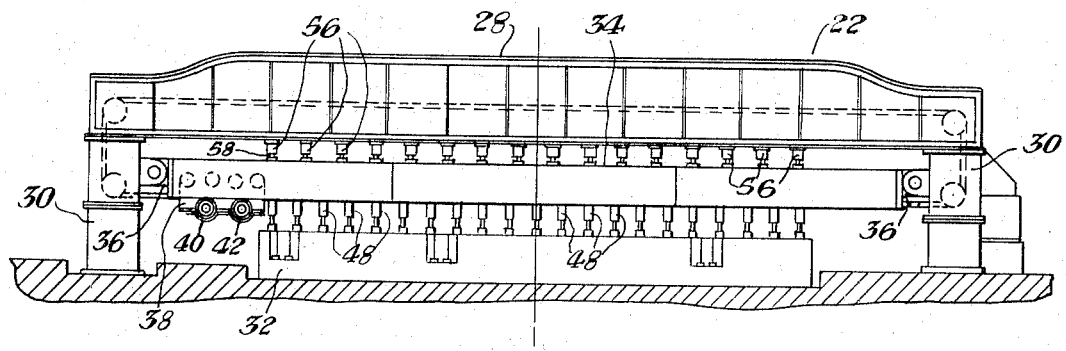
FIG. 2 is a front elevational view of the cutting apparatus as shown in FIG. 1 and taken along reference line II—II thereof.
Figure 6:
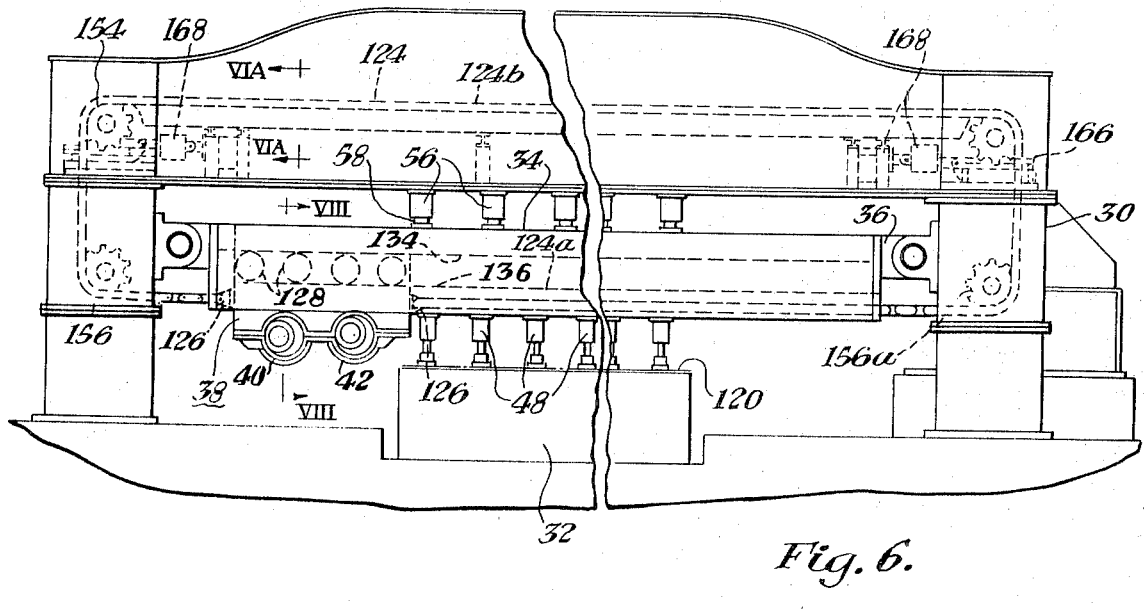
FIG. 6 is a partial, enlarged vertically sectioned view of the apparatus as shown in FIG. 2.

As better shown in Figures 2 and 4 and 6, a third array or row of hold down cylinders 56 are secured between the bridging beam 28 and the top surface of the contour beam 34. With the knife carriage 38 in its non-operating position as shown in Figures 2 and 6 the contouring cylinders are variously actuated for the extension of their piston rods 58 through increasing distances from either end of the cylinder row 56 toward the center line 60 (Figure 4) of the contour beam 34 and bridging beam 28. As the bridging or back up beam 28 is constructed in much sturdier fashion, the contour beam 34 is slightly but preferentially bowed downwardly or toward the worktable 32 as shown in exaggerated form in Figure 4. The degree to which the contour beam is bowed is preselected such that the reactive forces exerted upon the knife carriage and contour beam 34 at any point along the worktable 32 effectively cancels the displacement caused by bowing forces imparted to the contour beam at such point. As a result the contour beam 34 is returned to a reference plane parallel to the worktable 32 and the stationary cutters 44, 46 therein as shown in Figures 2 and 6. A consistent and accurate depth of cut therefore can be made in the plate material by the cutters or knives 40, 42. The amount of prebowing to which the contour beam 34 is subjected will depend upon the lengths and beam strengths of the bridging beam 28 and contour beam 34, structure of the prebowing cylinders 56, and the requisite cutting forces directed transversely of the material 52 or 54. The cutting forces will vary with the hardness and thickness of the plate or other material 52 or 54 being cut. These parameters, however, can be readily calculated by those skilled in the art.

The feed mechanism 24 (FIG. 1) includes in this example a conventional castor bed denoted by chain outline 62 thereof. Suitable push mechanisms 64, 66 are provided respectively for feeding a plate lengthwise (chain outline 68) or widthwise (chain outline 70) into the cutting apparatus 22.

In this example, the lengthwise push means 64 includes a pair of laterally inter-connected drive motors 72 operating through speed reducers 74 to drive lead screws 76. Each lead screw 76 is provided with a suitable clamp 78 (FIG. 3) and air cylinder 80 or the like for engaging the lead screw with the trailing edge of plate 68.

When it is desired to feed the plate widthwise the plate is pivoted to the position 70 (FIG. 1) thereof by suitable means (not shown). The use of the castor bed 62 facilitates pivoting the plate between the position 68, 70 for trimming or squaring the four edges thereof and for making longitudinal and transverse cuts or slits therein. In the position 70 the plate is fed by stroking mechanism 71 including a relatively long stroke cylinder 73, the distal end of whose piston rod acts successively against stops 75 to move the plate 70 through the cutting apparatus 20. The chain conveyors 84 are more closely spaced in the area juxtaposed to the plate position 70, as better shown in Figures 1 and 10 in order to accommodate the increased loading. The stroking mechanism 71 is further provided with a cylinder operated jaw 77 of substantially conventional construction for engagement with the trailing edge of the plate.

After the cutting or slitting operation is completed the plate is pushed across the table 32, which is provided with lift cylinders 82 (FIGS. 10 and 12) for that purpose, and onto conveyor chains 84 driven by a common drive shaft 86, which has in this example drive means 88 coupled to each end thereof.

Edge trimmings or slitting waste are, in somewhat a similar manner, removed from the table 32 by the disposal mechanism 26, as better shown in FIGS. 10—12. The cutting waste is pushed onto the right hand portion 90 of the table as viewed in FIG. 10 of the drawings where means, including a screw type scrap conveyor 94, are provided for conveying the scrap to conventional scrap shearing mechanism (not shown).

Specifically, the scrap is pushed onto wheeled carts 96 which in the position shown in FIG. 11 are supported substantially flush with the worktable section 90. With the scrap so disposed, for example as denoted by chain outline 98 thereof in FIG. 10, carriages 100 are moved toward the worktable 32 and onto the elevating ramps 102. This motion causes the wheeled carts 96 to lift the scrap 98 from the surface 90 of the table 32. To receive the adjacent end portions of the carts 96 and the associated carriages 100, the worktable 32 is deeply notched or indented at 104. With the carriages 100 in the elevated positions as denoted by chain outline 106 (FIG. 11) thereof, the carts 96 with the scrap thereon are then moved to the right to remove the scrap from the worktable 32. The carts 96 and carriages 100 are moved in this fashion by rack and pinion drives denoted generally and respectively by reference characters 108, 110.

To accommodate the elevating movements of the carts 96, toggle links 112 are coupled individually to the carts 96 and to their push rods 114. On the other hand elevation of the carriages 100 is accommodated by pivot 116 and their shorter push rods 118. When the carriages 100 have been moved to their solid outline positions (FIG. 11) and the carts 96 are withdrawn to their chain outline positions 120 (FIG. 11), the scrap material supported thereon is transferred to the scrap conveyor 94 by means of rack and pinion drives or the like (not shown).

Referring now more particularly to FIGS. 2—9 of the drawings, an exemplary form of the knife carriage 38 is disclosed in detail together with means for dragging the carriage 38 across the worktable 32 in scoring and shearing contact with a plate 120 thereon. Such means are operable in conjunction with the contour beam 34 described previously. In furtherance of this purpose the knife carriage is mounted upon the contour beam 34 which, as better shown in FIG. 7 of the drawings, is provided with a pair of guideways 122 to accommodate a roller chain (FIG. 6A) designated generally by reference character 124 and described hereinafter. The adjacent ends of the roller chain 124 are secured to the knife carriage 38 by means of brackets 126 affixed to the front and rear of the carriage (FIGS. 6 and 9).

The knife carriage itself is further provided with a number of pairs of rollers 128 (FIGS. 6 and 7) mounted with suitable bearings on shafts 130 extending through the upper portions of the knife carriage 38. The rollers 128 are substantially enclosed in a pair of guideways 132 likewise formed in the contour beam 34 at positions above but generally parallel to the roller chain guideways 122. The rollers 128 are closely disposed with respective pairs of track members 134, 136 mounted in the contour beam upper guideways 132. When the knife carriage is loaded as when during the cutting operation, rollers 128 bearingly engage the upper track members (FIG. 6) to transfer the transverse, reactive cutting forces to the contour beam 34. On the other hand, when the knife carriage 38 is returned to its initial position or is otherwise unloaded, its weight is exerted against the lower track members 136.

Figure 5:
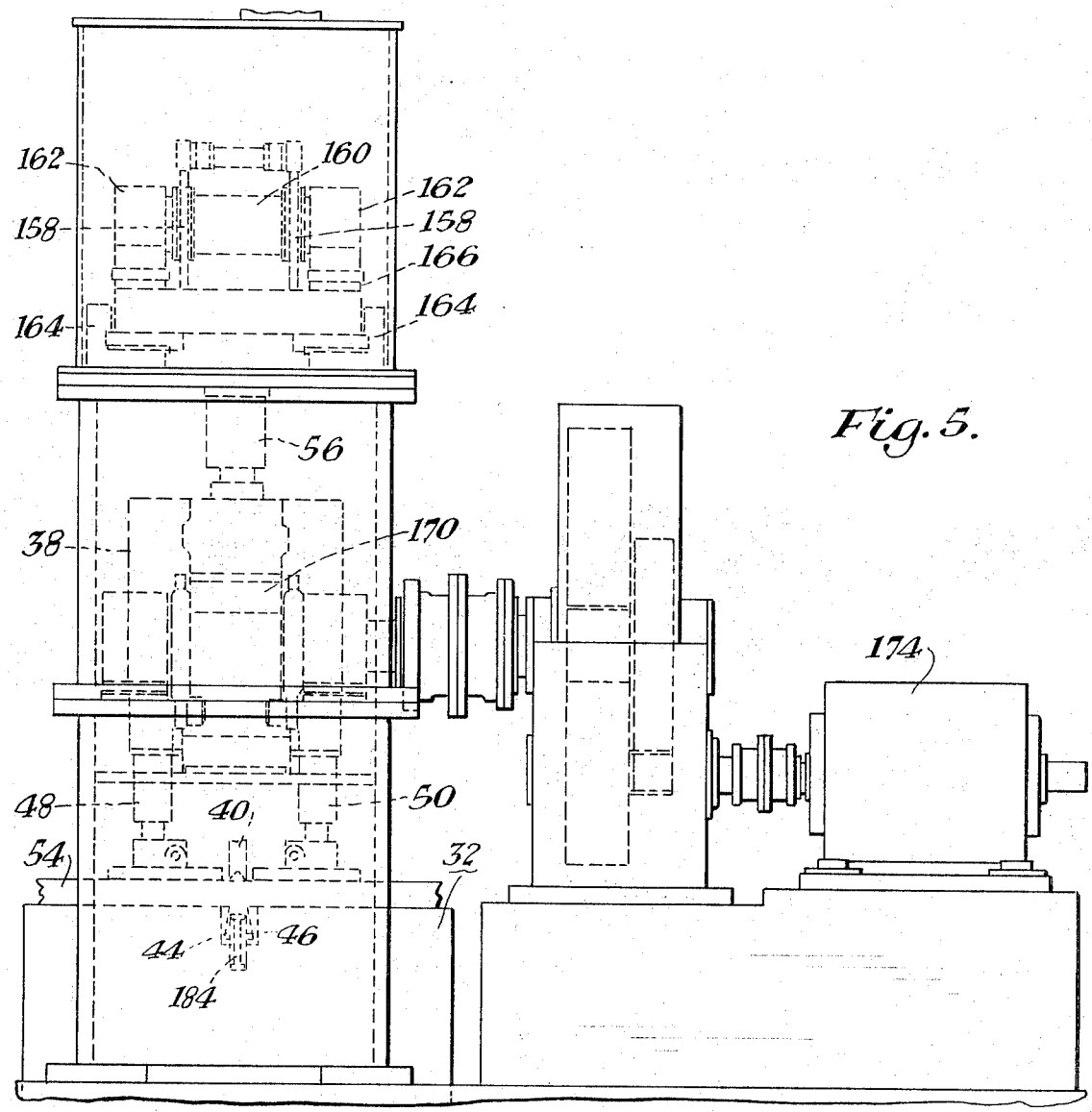
FIG. 5 is a partial enlarged side elevational view of the apparatus as shown in FIG. 3.
Figure 6A:
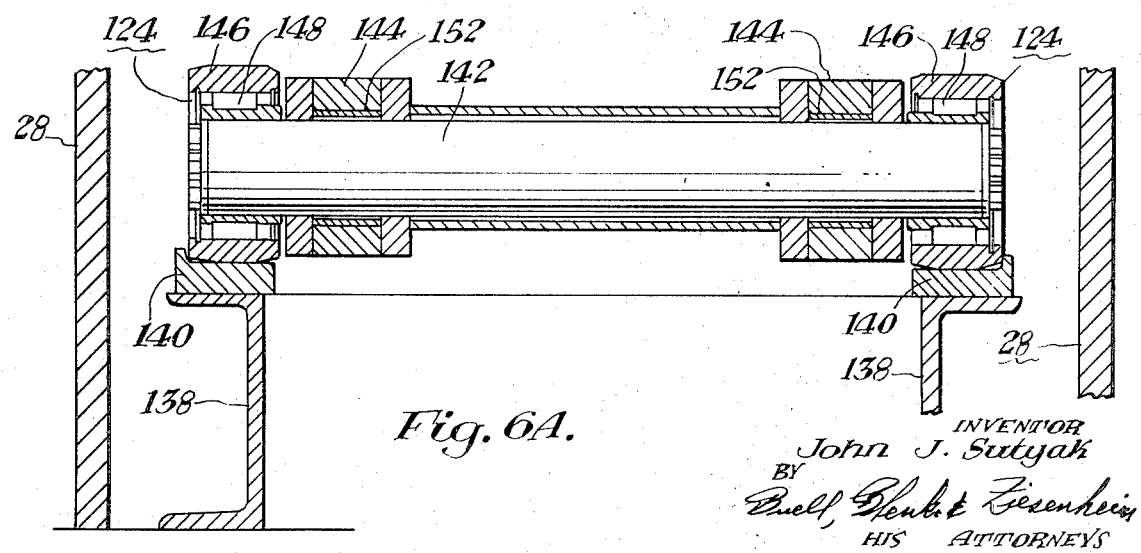
FIG. 6A is a further enlarged, partial cross sectional view of the mechanism as shown in FIG. 6 and taken along reference line VIA—VIA thereof.
Figure 7:
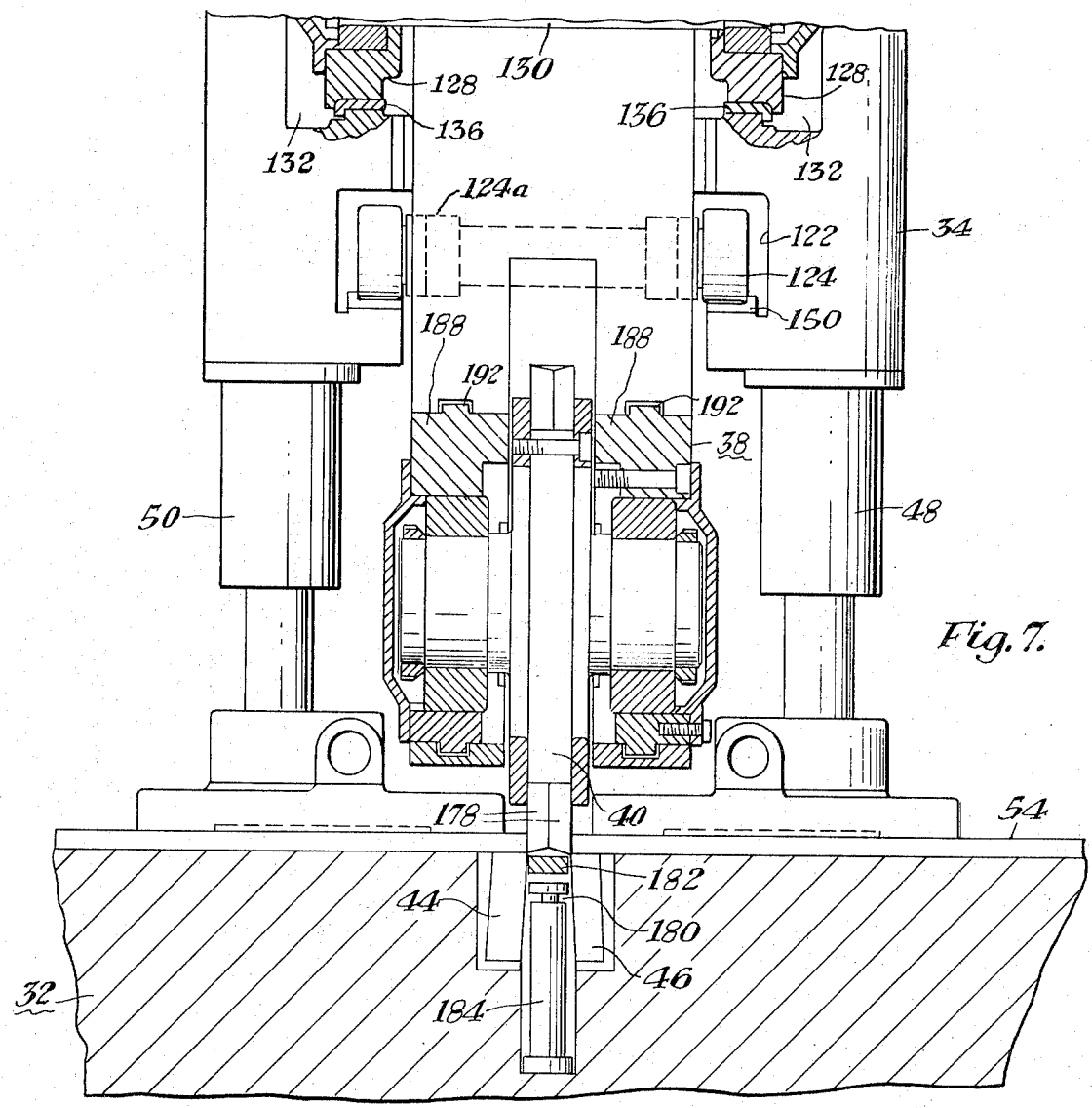
FIGS. 7 and 7A are partial, further enlarged, vertically sectioned views of the apparatus as shown in FIG. 6 and taken generally along reference line VII—VII thereof.

Referring now more particularly to FIGS. 5—7 of the drawings, the knife carriage 38 is moved by roller chain 124 the lower run 124a of which is supported throughout its length by the aforementioned guideways 122 of the contour beam 34. As better shown in FIGS. 6 and 6A the upper run 124b of the chain 124 is supported throughout its length by a pair of channeled beams 138 and track members 140 therein forming part of the bridging beam 28 of the cutting apparatus 22. The roller chain 124 is provided with a large number of closely spaced rollers 142 connected through chain links 144. Outrigger rollers 146 are mounted with suitable anti-frictional means, such as roller bearings 148, on the outward end portions respectively of each roller 142. The outrigger rollers 146 engage respectively the track members 140 of the supporting beam 28 and similar track members 150 mounted in guideways 122 of the contour beam 34, as better shown in FIG. 7. The chain links 144 desirably are provided with anti-frictional means such as sleeve bearings 152 at the points of their engagement with rollers 142.

Figure 3:
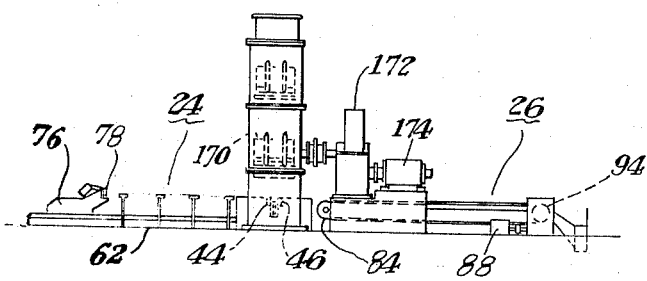
FIG. 3 is a side elevational view of the apparatus as shown in FIG. 2.

The chain 124 with the knife carriage 38 secured thereto is moved across the worktable 32 by engagement of the chain 124 with a number of sprocket means 154, 156, with a pair of the sprocket means being rotatably mounted in this example at each end of the cutting apparatus 22, as better shown in FIGS. 3, 5 and 6.

Each of the sprocket means 154 or 156, as better shown in FIGS. 3 and 5 includes a pair of sprockets 158 secured to shaft 160 for rotation therewith, with the shaft 160 being supported in suitable anti-frictional means such as pillow blocks 162. The sprockets 158 respectively engage the outboard rollers 146 (FIG. 6A) of the roller chain 124. In the arrangement shown the bearing means 162 for the upper pair of sprocket means 154 are slidably mounted at 164 to facilitate tensioning the roller chain 124. In furtherance of this purpose the upper sprocket means pillow blocks are mounted on slide carriages 166 which are moved outwardly and oppositely by conventional chain take-up mechanisms generally denoted by reference characters 168, as better shown in FIG. 6.

In this arrangement one of the lower sprocket means 156, for example the sprocket means 156a (FIG. 6) are employed for driving the roller chain 124. For this purpose, sprocket shaft 170 is extended, as better shown in FIG. 5, for connection to a suitable gearing train 172 or other speed reducer driven by appropriate drive means such as electric motor 174.

Referring again to FIGS. 6—9, an exemplary form of the carriage 38 is illustrated in detail. As pointed out previously the carriage 38 is provided with a pair of tandemly mounted knives 40, 42, which in this example are rotary shear blades, each having a pair of circumferentially shaped knife edges 176 or 178. Each pair of the circumferential knife edges 176, 178 is juxtaposed respectively to the elongated stationary, and generally parallel knives 44, 46 mounted as aforesaid in the worktable 32. As better shown in FIGS. 7 and 7A the stationary knives 44, 46 are mounted with a longitudinal space 180 therebetween, and each pair of rotary knife edges 176, 178 are juxtaposed respectively to the stationary knives 44, 46. During the cutting operation the space 180 provides a receptacle for cutting waste, which is subsequently removed from the space 180 by means presently to be described.

In the operation of the cutting apparatus 22, the leading rotary shear for example the blade 40 is vertically adjusted (by means described below) relative to the worktable 32 to produce one or a pair of parallel score lines in the plate material or the like to a depth sufficient to penetrate the work-hardened skin layer thereof. For most edge trimming operations (FIG. 7A) a single score line is produced, while parallel score lines are necessary for plate slitting or severing (FIG. 7). The second rotary blade 42 (FIGS. 2 and 6) is mounted on the knife carriage 38 in alignment of its knife edges 178 with the aforementioned score lines respectively. The second or parting blade 42 is likewise vertically adjusted relative to the worktable 32 so that its knife edges 178 in cooperation with the stationary knives 44, 46 shear or part the relatively narrow waste strip 182 between the aforementioned score lines, to sever the aforementioned plate material very accurately into two sections thereof.

Figure 7A:
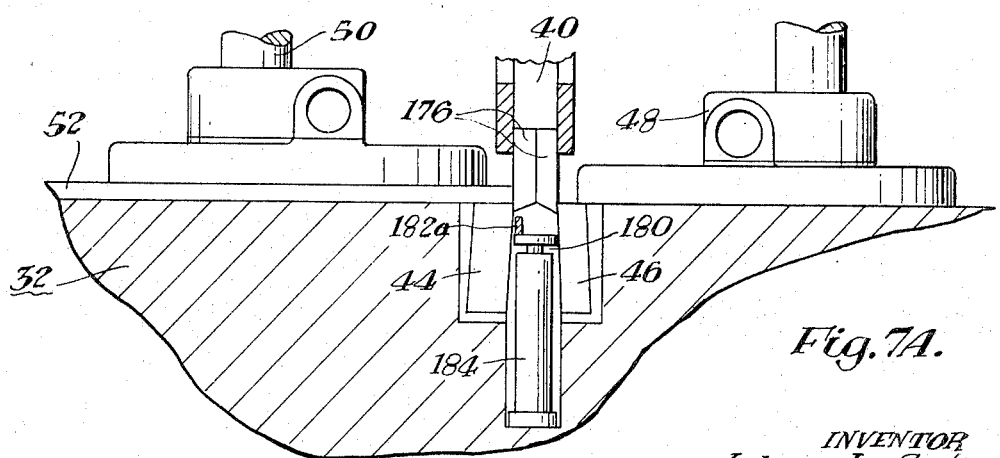

The slitting or trimming waste 182 or 182a (FIGS. 7 or 7A) is pushed into the space 180 between the stationary blades 46, 44 by the shearing action of the rotary blade 42. After the plate sections are removed, upon release of clamping cylinders 48, 50, the scrap 182 or 182a is removed from the space 180 between the stationary knives 44, 46 by a plurality of rejection cylinders 184 (FIGS. 5, 7 and 7A). The scrap 182 is then removed from the table 32 in the manner described previously.

To provide the aforementioned vertical adjustment means for each of the rotary blades 40 or 42, the latter are respectively and rotatably mounted within a pair of eccentric bearing housings 186 or 188 supported on the knife carriage 38 as better shown in FIGS. 7-9 of the drawings. Vertical adjustment of each of the rotary blades 40 or 42 is effected by angularly displacing the associated eccentric bearing housing 186 or 188. In furtherance of this purpose each of the bearing housings 186 or 188 is provided with a circumferential gear 190 or 192 formed in this example integrally therewith. As better shown in FIGS. 8 and 9 the bearing housing gears can be rotated respectively by enmeshed idler gears 194, 196 and pinion shafts 198, 200. Each pinion shaft desirably is provided with a wrench configuration 202 protruding outwardly of the knife carriage 38 for engagement by a suitable tool. When such adjustment has been made to the user's satisfaction, the pinion shafts 198, 200 are locked against further revolution by clamp plates 204.

From the foregoing it will be apparent that novel and efficient forms of edging and slitting methods and apparatus have been described herein. While I have shown and described certain presently preferred embodiments of the invention and have illustrated presently preferred methods of practicing the same it is to be distinctly understood that the invention is not limited thereto but may be variously embodied and practiced within the spirit and scope thereof.

I claim:

1. Cutting apparatus comprising elongated cutting means, means for mounting said cutting means for substantially contingent engagement by material to be cut by said apparatus, first and second cutting means, means for tandemly mounting said first and said second cutting means in juxtaposition to said elongated cutting means for cutting engagement with said material when disposed therebetween, means for urging said first cutting means into scoring engagement with said material, means for urging said second cutting means into shearing or parting engagement with said material along the scoring produced by said first cutting means, and means for moving said first and said second cutting means relative to said elongated cutting means, each of said first and said second cutting means being provided with a pair of spaced knife edges, said elongated cutting means including a pair of elongated similarly spaced generally parallel knife edges, said knife edges of each of said first and said second cutting means being juxtaposed respectively to said parallel knife edges for material slitting operations, said first cutting means being capable of producing scoring cuts approximately to the depth of a work-hardened or skin layer of said material so that cutting distortions of said first and said second cutting means are imparted substantially exclusively to slitting waste cut from said material, said distortions coacting upon said slitting waste to substantially prevent said waste from curling and jamming between said elongated knife edges.

2. The combination according to claim 1 wherein said first and said second cutting means include rotary blades rotatably mounted in a common support therefor.

3. The combination according to claim 2 wherein means are provided for independently adjusting the distance of each of said first and said second cutting means from said elongated cutting means.

4. The combination according to claim 1 wherein waste-receiving chamber means are positioned below said parallel knife edges and substantially coextending therewith to receive slitting waste from said slitting operations.

5. Cutting apparatus comprising elongated cutting means, means for mounting said cutting means for substantially contingent engagement by material to be cut by said apparatus, first and second cutting means, means for tandemly mounting said first and said second cutting means in juxtaposition to said elongated cutting means for cutting engagement with said material when disposed therebetween, means for urging said first cutting means into scoring engagement with said material, means for urging said second cutting means into shearing or parting engagement with said material along the scoring produced by said first cutting means, means for moving said first and said second cutting means relative to elongated cutting means, each of said first and said second cutting means being provided with a pair of spaced knife edges, said elongated cutting means including a pair of elongated similarly spaced generally parallel knife edges, said knife edges of each of said first and said second cutting means being juxtaposed respectively to said parallel knife edges for material slitting operations, waste-receiving chamber means positioned below said parallel knife edges and substantially coextending therewith to receive slitting waste from said slitting operations, and means mounted in said chamber means for ejecting said scrap in a reversed direction through the space between said elongated knife edges.

6. Cutting apparatus comprising elongated cutting means, means for mounting said cutting means for substantially contingent engagement by material to be cut by said apparatus, first and second cutting means each having a pair of knife edges, means for tandemly mounting said first and said second cutting means in juxtaposition to said elongated cutting means for cutting engagement with said material when disposed therebetween, means for urging said first cutting means into scoring engagement with said material, means for urging said second cutting means into shearing or parting engagement with said material along the score lines produced by said first cutting means, and means for moving said first and said second cutting means relative to said elongated cutting means, said first and said second cutting means being mounted respectively in eccentrically and rotatably mounted housings therefor for adjusting the juxtaposed distances between said first and said second cutting means and said elongated cutting means.

7. The combination according to claim 6 wherein said first and said second cutting means include rotary blades respectively and rotatably mounted in said eccentric housings.

8. Cutting apparatus comprising elongated cutting means, means for mounting said cutting means for substantially contingent engagement by material to be cut by said apparatus, first and second cutting means, means for tandemly mounting said first and said second cutting means in juxtaposition to said elongated cutting means for cutting engagement with said material when disposed therebetween, means for urging said first cutting means into scoring engagement with said material, means for urging said second cutting means into shearing or parting engagement with said material along the scoring produced by said first cutting means, means for moving said first and said second cutting means relative to elongated cutting means, said mounting means including a knife carriage mounted for movement along supporting means extending generally parallel to said elongated cutting means, said carriage supporting means including a contour beam extending generally parallel to said elongated cutting means, and means for applying variable bending forces to said contour beam to impart a pre-selected variable and pre-bowed profile of said contour beam in a direction toward said elongated cutting means.

9. Cutting apparatus comprising elongated cutting means, means for mounting said cutting means for substantially contingent engagement by material to be cut by said apparatus, first and second cutting means, means for tandemly mounting said first and said second cutting means in juxtaposition to said elongated cutting means for cutting engagement with said material when disposed therebetween, means for urging said first cutting means into scoring engagement with said material, means for urging said second cutting means into shearing or parting engagement with said material along the scoring produced by said first cutting means, means for moving said first and said second cutting means relative to elongated cutting means, said elongated cutting means being mounted flushly in a worktable forming part of said apparatus, feeding means for said material disposed in generally co-planar alignment with said worktable, said feeding means including a castor bed, and pushing means respectively for releasably engaging adjacent lateral edges of said material when disposed on said castor bed.

10. The combination according to claim 9 wherein said feeding means include in addition a plurality of chain conveyors mounted adjacent an opposite side of said table and transversely of said elongated cutting means.

11. Cutting apparatus comprising elongated cutting means, means for mounting said cutting means for substantially contingent engagement by material to be cut by said apparatus, first and second cutting means, means for tandemly mounting said first and said second cutting means in juxtaposition to said elongated cutting means for cutting engagement with said material when disposed therebetween, means for urging said first cutting means into scoring engagement with said material, means for urging said second cutting means into shearing or parting engagement with said material along the scoring produced by said first cutting means, means for moving said first and said second cutting means relative to elongated cutting means, each of said first and said second cutting means being provided with a pair of spaced knife edges, said elongated cutting means including a pair of elongated similarly spaced generally parallel knife edges, said knife edges of each of said first and said second cutting means being juxtaposed respectively to said parallel knife edges for material slitting operations, and scrap disposal means mounted adjacent said elongated cutting means mounting means and coextending substantially therewith for ejecting scrap from said mounting means and in a reversed direction through the space between said elongated knife edges.

12. Cutting apparatus comprising elongated cutting means, means for mounting said cutting means for substantially contingent engagement by material to be cut by said apparatus, first and second cutting means, means for tandemly mounting said first and said second cutting means in juxtaposition to said elongated cutting means for cutting engagement with said material when disposed therebetween, means for urging said first cutting means into scoring engagement with said material, means for urging said second cutting means into shearing or parting engagement with said material along the scoring produced by said first cutting means, means for moving said first and said second cutting means relative to elongated cutting means, scrap disposal means mounted adjacent said elongated cutting means mounting means and coextending substantially therewith for ejecting scrap from said mounting means and through the space between said elongated knife edges, said mounting means including a worktable, and said disposal means including a plurality of transversely disposed conveyors having end portions protruded respectively into deeply notched portions of said worktable.

13. The combination according to claim 12 wherein each of said conveyors includes a carriage having a cart movably mounted thereon, said carriages being mounted on a ramped track for elevation of said carts and carriages at positions adjacent said worktable notches respectively.

14. The combination according to claim 8 wherein said contour beam is extended spacedly between said mounting means and a back-up beam spaced therefrom, said force applying means being coupled between said contour beam and said back-up beam.

15. The combination according to claim 14 wherein workpiece hold-down means are mounted on said contour beam and are extended along the length thereof.

16. The combination according to claim 14 wherein said force applying means are capable of actuation such that said contour beam is bowed generally toward said mounting means.

17. The combination according to claim 14 wherein said force applying means include a plurality of spaced piston and cylinder arrangements coupled transversely between said contour beam and said back-up beam.

* * * * *